United States Patent Office 2,792,929
Patented May 21, 1957

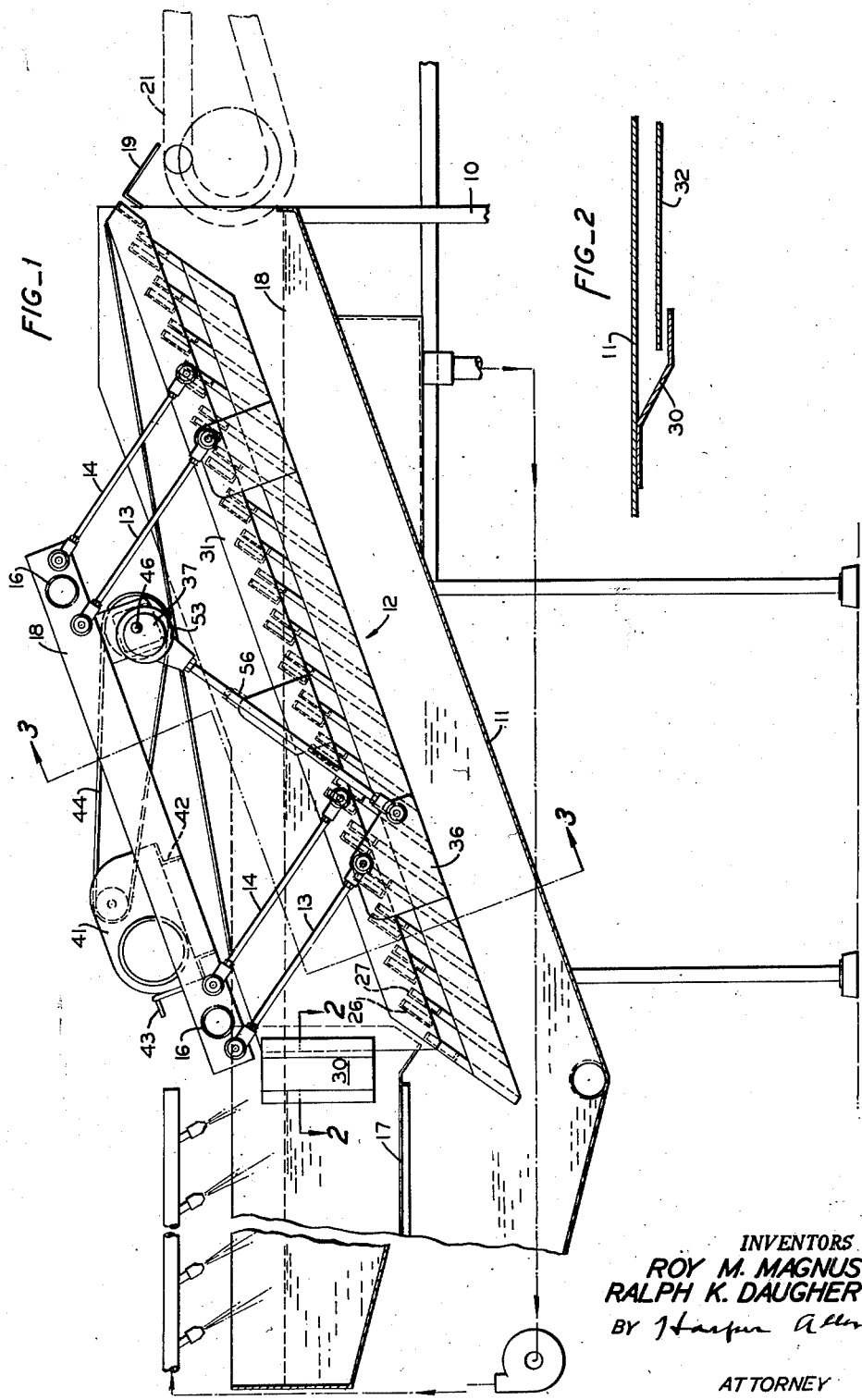

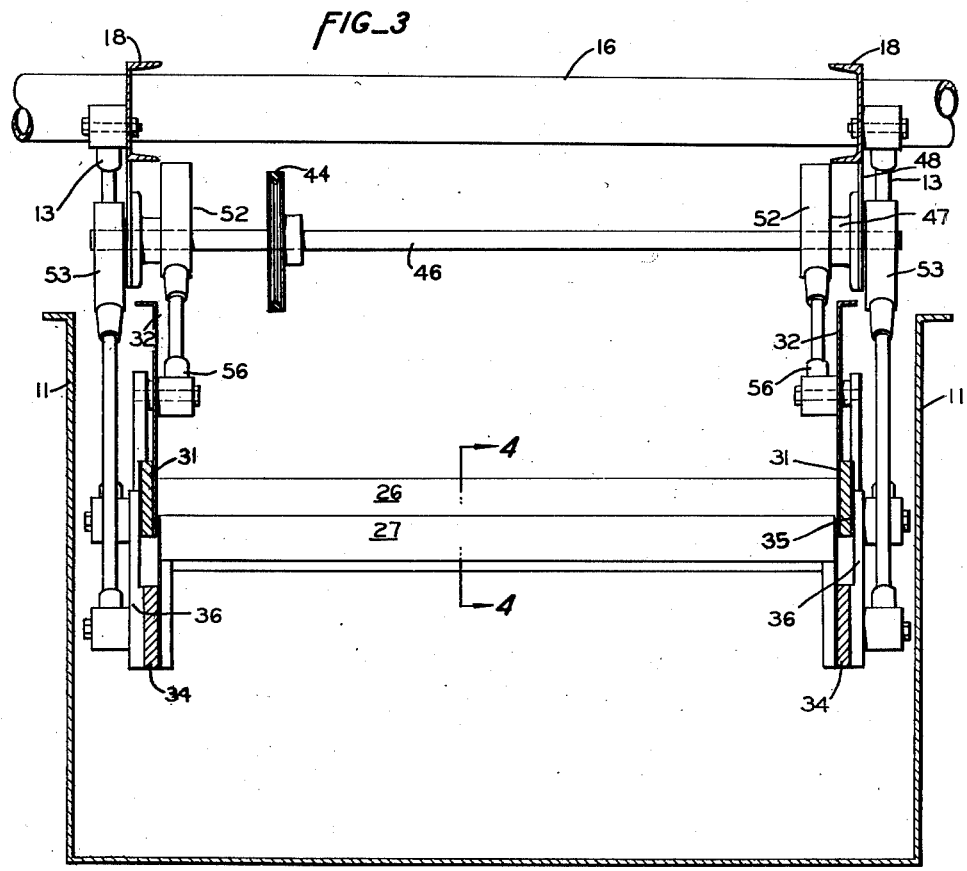
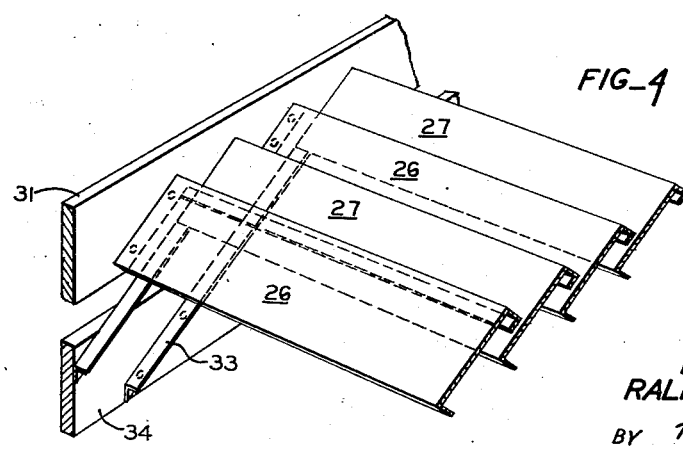

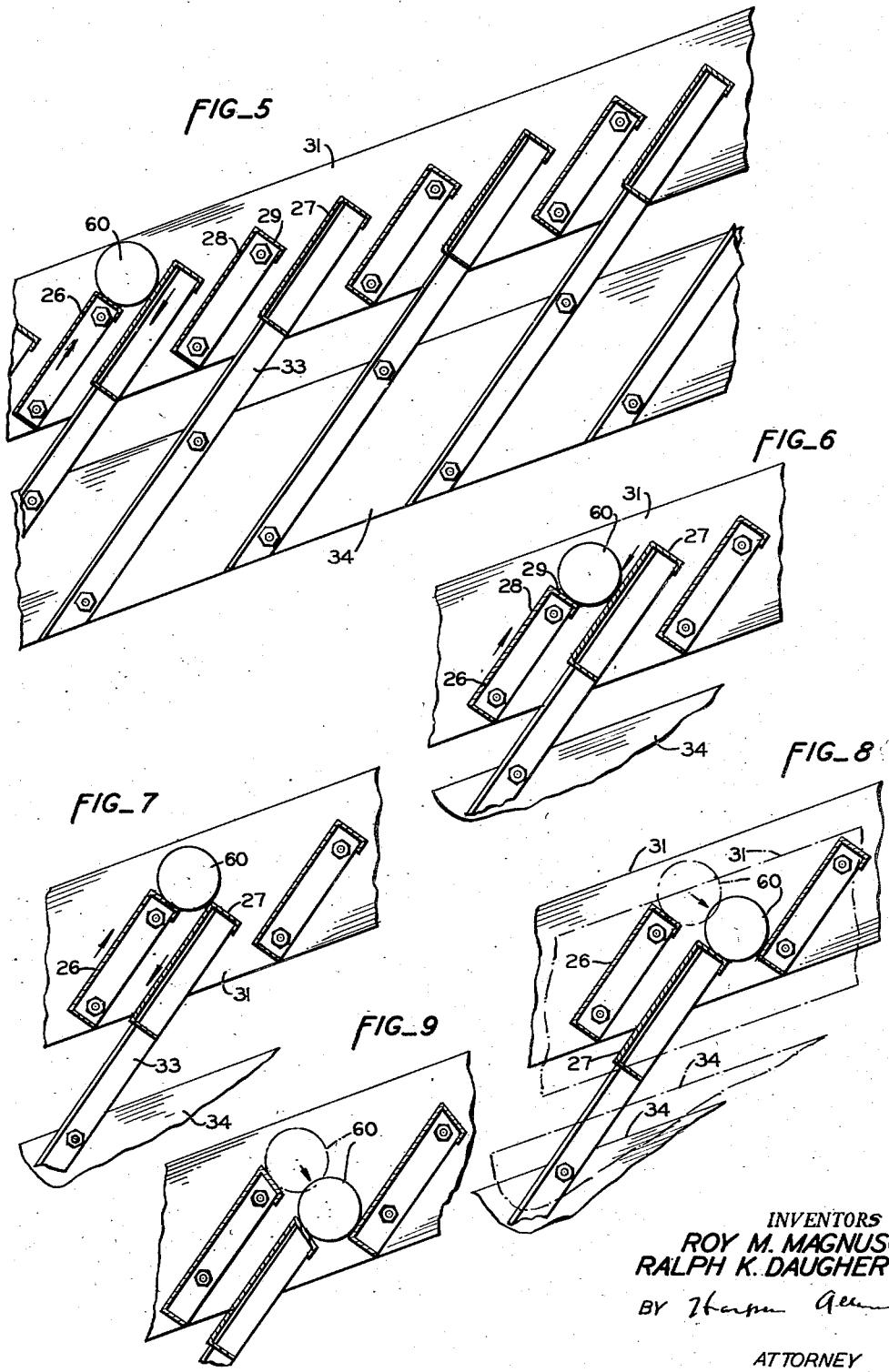

2,792,929

SHUFFLE FEED STRUCTURE

Roy M. Magnuson, Santa Clara County, and Ralph K. Daugherty, San Jose, Calif.; said Ralph K. Daugherty assignor to said Roy M. Magnuson; Genevieve I. Magnuson, executrix of said Roy M. Magnuson, deceased Application May 17, 1955, Serial No. 508,978

5 Claims. (Cl. 198—218)

The present invention relates to shuffle feed structures and is concerned more particularly with an improved shuffle feed mechanism in which all shuffle feed members move and have a faster speed of operation, and also provided with an improved overhead mounting for the shuffle feed members and the operating parts therefrom so that the structure is adapted to work in a liquid to elevate fruit or other articles from the solution.

It is the general object of the invention to provide an improved shuffle feed structure.

It is another object of the invention to provide an improved shuffle feed mechanism for operating in a liquid to remove articles, such as fruit or vegetables, from the liquid.

A further object of the invention is to provide a shuffle feed structure having both sets of shuffles movable thereto enabling a faster and smoother operation.

Further objects and advantages of the invention will be apparent from the following description of a preferred embodiment thereof, taken in conjunction with the accompanying drawings, in which:

Figure 1 is a side elevational view, partially broken away, showing a shuffle feed structure embodying the instant invention.

Figure 2 is a fragmentary horizontal section, taken as indicated by the line 2—2 in Figure 1.

Figure 3 is a sectional view of the shuffle feed structure taken in planes indicated by the lines 3—3 in Figure 1.

Figure 4 is a fragmentary perspective view illustrating details of construction.

Figure 5 is a fragmentary sectional view, taken in the plane indicated by the line 5—5 in Figure 2, and illustrating an operating relation of the shuffle feed members, certain parts being omitted for clarity in illustration.

Figure 6 is a fragmentary view similar to Figure 5 but showing the parts in a different operating position.

Figure 7 is a view similar to Figures 5 and 6 and illustrating another operating view of certain shuffle feed members.

Figure 8 is a view similar to Figures 5, 6 and 7 and illustrating a fourth operational view of the parts.

Figure 9 is a modified view similar to Figure 8.

Referring to Figures 1 and 3, the shuffle feed structure of the instant invention includes a supporting framework 10 on which a tank 11 is mounted. Within and above the tank 11, is a shuffle feed structure 12 which is supported by four sets or pairs of parallel links 13 and 14 from channel members 15 supported on cross pipes 16 which are suitably mounted on the frame structure 10. Within the tank 11 is a screen type delivery platform 17 which leads to the submerged feed end shuffle structure 12 below the lever 18 of liquid, and at the discharge end of the shuffle structure a discharge ramp 19 leads to a conventional conveyer 21.

Suitable means are provided for circulating liquid so that a general flow is provided from the left of Figure 1 toward the shuffle feed structure to deliver articles thereto. This means includes a pump 22 (Figure 1) having an intake pipe 23 opening into the tank 11 and having a discharge pipe 24 connected to a series of inclined spray heads 25 directed toward the structure 12.

The shuffle feed structure 12 per se comprises similar movable sets of independently supported and alternately arranged shuffle members 26 and 27 (Figures 4 and 5). These members are fabricated from sheet metal, and are mounted in inclined position, having a long upwardly facing article supporting portion 28, and a short upwardly facing article feeding and supporting portion 29. These two portions are generally disposed at an angle of 90° to each other, but may include an angle of less than 90° as shown in Figure 9. One series of shuffle feed members 26 extends between and are bolted to opposite frame members 31 (Figures 1 and 3) which carry upright side plates 32 to aid in confining the articles within the transverse confines of the shuffle feed. At either side of the tank 11, a guide or baffle plate 30 (Figures 1 and 2) is disposed inside each plate 32. These opposite upper members 31, being rigidly connected by the transverse shuffle members 26, form a framework which is supported by four parallel links 14. The other shuffle feed members 27 are carried by angles 33 from a lower pair of opposite bars or frame members 34, and these frame members 34 each have a pair of upstanding side plates or brackets 36 by which they are supported by four parallel links 14. Wear pads 35 are secured to the frame members 31 where the brackets 36 overlap. All of the links 13 and 14 are pivotally connected by means of rubber torsion bushings at their lower ends to the respective members noted, and are similarly connected at their upper ends to the side channels 15 of the frame.

Means is provided for driving or reciprocating the sets of shuffle feed members, in opposite directions. This means includes a variable sped of drive motor 41 (Figure 1) suitably mounted on transverse angles 42 between the side channels 15, and having a hand wheel 43 for controlling the varying of the speed drive thereof. The motor 41 drives through a suitable belt and pulley arrangement 44 a transverse shaft 46 (Figures 1 and 3) suitably journalled in bearings 47 on plates 48 depending from channel 14, and carrying respective pairs of eccentrics 51 and 52, which are engaged by suitable eccentric followers 53, connected by links 54 and 56, respectively, with the upper set of shuffle members 28, and the lower set of shuffle members 29. As seen in Figure 3, there are a pair of eccentrics 51 for each set of shuffle members, and similarly a pair of connecting cranks 54 and 56 so that uniform actuation is assured in balanced relation.

From the foregoing description, it will be noted that the shuffle feed members in their entirety are supported from a region above the shuffle feed structure, so that the structure can be suspended or immersed in a liquid, to feed articles therefrom. Also, the type of pivotal connections, being rubber torsion bushings, are such that they will not be subject to interference by reason of being immersed in the water. Also, it will be noted, referring to Figure 3, that the baffle plates 30 of the tank 11 lie between the side partitions 32 carried by one set of the shuffle feed members to guide the flow of fruit or vegetable articles into the region of the feed structure under the influence of the liquid flow or circulation induced by the spray from the spray heads 25.

Referring to Figures 1 and 8, the shuffle feed structures are shown at the end of the stroke of the eccentrics 51, so that they are at their farthest separated point, in which the upper shuffle feed member 26 is slightly advanced over the lower shuffle feed member 27 and is in position to deliver an article 60 from one shuffle feed member to the next, as shown in Figure 8. Also, in Figure 8, in phantom lines the side frame members 31 and 34 are shown in their closest approach to each other, thereby illustrating the range or extent of stroke of the shuffle feed structure. Figure 5 shows the shuffle feed in a position to advance the article 60 from a lower member 27 to the next adjacent upper member to the right, and just ahead of the point of roll-off, which is substantially midway of the stroke of movement. The oscillating reciprocating action of the shuffle feed members result in the advance of article 60 from valley to valley as the operation proceeds, and the extent of movement of the shuffle feed members in effecting this advance is substantially one half of the dimension of the surface 28 of these members, contrary to the usual full stroke of a shuffle feed where one set of shuffle members is stationary and the other set moves.

Figure 7 shows another position of the parts where an upper shuffle feed member 26 is just ahead of the position shown in Figure 8 to transfer the article 60 from one of the shuffle feed members to the next valley along the line of progression.

By virtue of this shortening of the stroke of the shuffle feed members, and by virtue of the mounting for oscillatory reciprocation, a faster rate of advance, because of the more rapid reciprocation of the members, is possible.

The submerging of the lower or feed end of the shuffle feed, and the separation of the tank into upper and lower stratas by the screen or platform 17, together with the induced circulation, provides an advantageous and effective feed for fruit or vegetable articles. Many articles, such as tomatoes, for example, float, and the portion of the tank at the feed end provides in effect an accumulator for tomatoes so that the shuffle feed will have at all times a substantially complete supply of articles to be lifted from the water. Also, because the articles are in effect floated onto the shuffle feed members, a gentle depositing action is accomplished when the supporting liquid is in effect drained out from under the articles through the shuffle feed structure. Even with articles heavier than water, such as certain onions, an effective feeding and depositing action of a gentle character is accomplished.

While I have shown and described a preferred embodiment of the invention, it will be apparent that the invention is capable of modification and variation from the form shown, so that the scope of the invention should be limited only by the proper scope of the claims appended hereto.

We claim:

1. A shuffle feed structure comprising a first pair of opposite side frame members, a first set of shuffle feed members connected between said first side frame members for movement in unison therewith, a second pair of opposite side frame members, a second set of shuffle feed members connected between said second pair of frame members, means for supporting said second set of shuffle members in parallel alternating relation to said first set of shuffle feed members to provide successive valleys, and means mounting each of said sets of shuffle members and side frame members therefor for reciprocation in parallel relation with respect to each other to provide a valley to valley progressing action for articles supported by the shuffle feed structure.

2. A structure as recited in claim 1, in which each shuffle member comprises two adjacent article engaging surfaces including an acute angle.

3. A shuffle feed structure comprising a first pair of opposite side frame members, a first set of shuffle feed members connected between said first side frame members for movement in unison therewith, a second pair of opposite side frame members disposed below said first set of frame members, a second set of shuffle feed members connected between said second pair of frame members, means for supporting said second set of shuffle members above the side frame members therefor and in parallel alternating relation to said first set of shuffle feed members to provide successive valleys, and means mounting each of said sets of shuffle members and side frame members therefor for reciprocation in parallel relation with respect to each other to provide a valley to valley progressing action for articles supported by the shuffle feed structure.

4. In a shuffle feed structure, a frame including elevated frame means, respective sets of shuffle members arranged alternately with respect to each other and disposed in inclined relation, respective linkage members extending upwardly from said respective sets to said frame means for supporting said respective sets of members for reciprocation, and drive means for affecting movement of all said members mounted on said frame means.

5. An article supporting and feeding shuffle feed structure comprising a first pair of opposite side frame members, a first set of shuffle feed members connected between said first side frame members for movement in unison therewith, a second pair of opposite side frame members, a second set of shuffle feed members connected between said second pair of frame members, means for supporting said second set of shuffle members in parallel alternating relation to said first set of shuffle feed members to provide successive valleys of an article supporting and feeding bed formed by said respective sets of shuffle feed members, each member of said sets having an article supporting face over which an article may be pushed and also a second face for pushing an article along the supporting face of an adjacent member, and means mounting each of said sets of shuffle members and side frame members therefor for reciprocation in parallel relation with respect to each other to provide a valley-to-valley progressing action for articles supported by the shuffle feed structure, said shuffle feed members effecting transfer of an article substantially midway of their respective strokes of movement, at which point adjacent members are moving in opposite directions and have their second faces lying substantially in the same plane.

References Cited in the file of this patent
UNITED STATES PATENTS

| | | |
|---|---|---|
| 1,754,612 | Cook | Apr. 15, 1930 |
| 1,795,450 | Sells | Mar. 10, 1931 |
| 1,951,046 | Wuest | Mar. 13, 1934 |
| 2,179,035 | Ferry | Nov. 8, 1939 |
| 2,191,744 | Scott | Feb. 27, 1940 |

FOREIGN PATENTS

| | | |
|---|---|---|
| 360,663 | Great Britain | Nov. 12, 1931 |